United States Patent
Wei et al.

[11] Patent Number: 5,440,806
[45] Date of Patent: Aug. 15, 1995

[54] METHOD OF MAKING BLANK FOR THE MANUFACTURING OF FIBER-REINFORCED COATINGS OR METAL COMPONENTS

[75] Inventors: William Wei, Munich; Thomas Stoll, Reutlingen, both of Germany

[73] Assignee: MTU Motoren- und Turbinen-Union Muenchen GmbH, Germany

[21] Appl. No.: 257,537

[22] Filed: Jun. 9, 1994

Related U.S. Application Data

[62] Division of Ser. No. 29,667, Mar. 11, 1993, Pat. No. 5,356,701.

Foreign Application Priority Data

Mar. 13, 1992 [DE] Germany ............ 42 08 100.9

[51] Int. Cl.⁶ .............................................. B23P 15/02
[52] U.S. Cl. ................................. 29/889.2; 29/419.1
[58] Field of Search ........................ 29/419.1, 889.2

[56] References Cited

U.S. PATENT DOCUMENTS

| | | | |
|---|---|---|---|
| 3,403,844 | 10/1968 | Stoffer | 29/419.1 |
| 3,427,185 | 2/1969 | Cheatham et al. | 29/419.1 |
| 3,505,717 | 4/1970 | Palfreyman | 29/419.1 |
| 3,615,983 | 10/1971 | Palfreyman et al. | 29/419.1 |
| 4,278,717 | 7/1981 | Aoyama | 428/36 |
| 4,559,248 | 12/1985 | Sumiyoshi et al. | 428/36 |
| 4,589,176 | 5/1986 | Rosman et al. | 29/419.1 |
| 5,222,296 | 6/1993 | Doorbar et al. | 29/419.1 |
| 5,305,520 | 4/1994 | Doorbar et al. | 29/419.1 |

*Primary Examiner*—Irene Cuda
*Assistant Examiner*—Mark V. Butler
*Attorney, Agent, or Firm*—Evenson, McKeown, Edwards & Lenahan

[57] ABSTRACT

A blank material for manufacturing fiber-reinforced coatings or metal components including fibers made of a high-strength material and metals or metal alloys, and a process for manufacturing the blank, and for manufacturing coatings and components made therefrom. The fibers are aligned in the blank in parallel to its axis, and metal wire meshes are knitted around them, with the fibers embedded at a distance from one another. By means of high-temperature isostatic pressing, metal components can be made, through which the reinforcing fibers extend at a uniform distance.

1 Claim, 4 Drawing Sheets

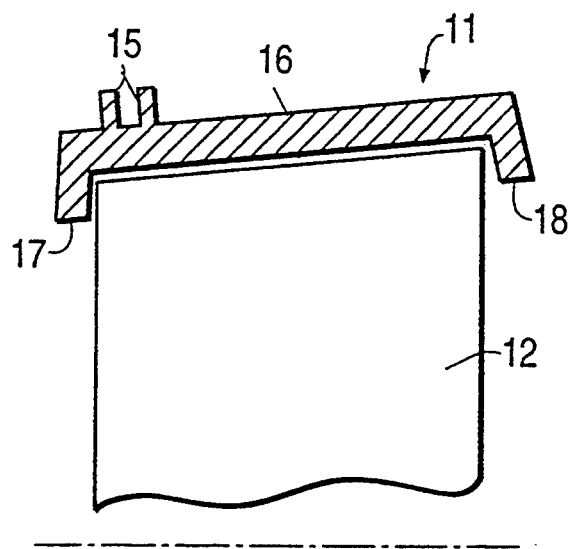
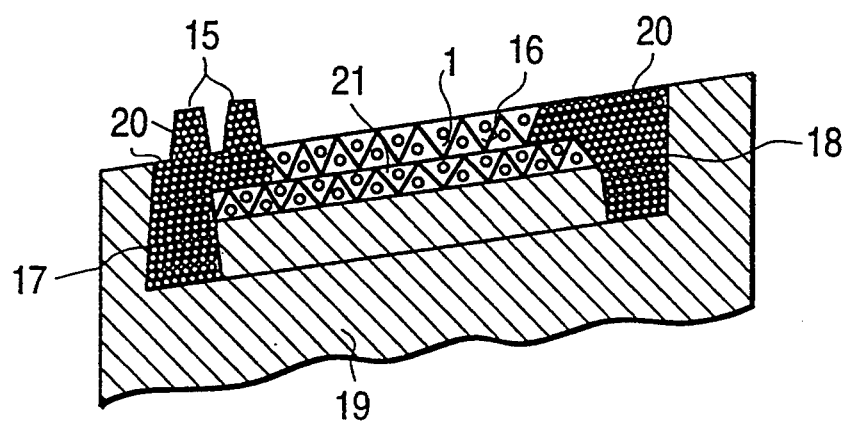

METHOD OF MAKING BLANK FOR THE MANUFACTURING OF FIBER-REINFORCED COATINGS OR METAL COMPONENTS

This is a Divisional of application Ser. No. 08/029,667, filed Mar. 11, 1993, now U.S. Pat. No. 5,356,701.

BACKGROUND AND SUMMARY OF THE INVENTION

This invention relates to a blank for use in manufacturing fiber-reinforced coatings or metal components, comprising fibers made of a high-strength material and metals of a lower strength than the fibers, as well as a process for manufacturing the blank, the coatings or the components.

U.S. Pat. No. 3,936,550, discloses a process for manufacturing fiber-reinforced coatings or metal components comprising fibers of a high-strength material and titanium or titanium alloys as the metal. For this purpose, the fibers are isostatically pressed between two titanium foil layers at high-temperature. However, because the fibers are not fixed in their position between the foil layers, they may become superimposed on one another or contact one another, during compression and therefore weaken the composite material at these points. Furthermore, such fibers and foil layers are relatively stiff, and cannot be applied or formed onto components or cores before high-temperature isostatic pressing. In addition, the fibers consist of boroxides which lose their stability even at a low thermal stress, and undergo a plastic deformation.

Another disadvantage of the known blank made of titanium foil layers and boroxide fibers is that, when the blank is compressed to form fiber-reinforced metal plates, the packing density of the fibers is limited. For components having several fiber layers above one another, when the blank disclosed in U.S. Pat. No. 3,936,550 is used, a metal foil layer is disposed between each fiber layer, which limits the packing density of the fibers. When the packing density of the fibers within one fiber layer is high, there is the risk that insufficient metal material will penetrate between the fibers during the compression to form a fiber-reinforced metal; thus pores, holes, or cavities which are free of matrix metal can remain in the composite material, weakening it and posing an increased breakage risk for the fibers.

It is an object of the present invention therefore to provide a blank of the above-mentioned type which can be formed onto components or cores without shifting of the fiber position, and without forming pores or cavities. The blank according to the invention therefore yields fiber-reinforced metal components with a high packing density of the fibers, and permits thermal pressing processes without any damage to the fibers of the blank.

According to the invention, this object is achieved in that the fibers are aligned parallel to the long axis of the blank, are embedded in a spaced manner in knitted metal wire meshes, and are stable with respect to high temperatures.

The blank according to the invention has the advantage that it is extremely flexible mechanically and in fact has superior flexibility compared to woven or felt structures. It can therefore be applied in a wider range of environments, and permits fiber-reinforced metal structures which up to now could not be achieved, by pressing or compressing of blanks according to the invention. The packing density of the fibers is limited only by the wire gauge of the knitted metal wire meshes. A blank according to the invention which is compressed to form a fiber-reinforced metal component, a semifinished metal product or a metal coating, has no holes, cavities or pores which are free of matrix metal, since the metal wire meshes completely surround each fiber. By the use of fibers in the blank which are stable at high temperatures, thermal pressing processes may advantageously be used during further processing of the blank.

A preferred material for the fibers is silicon carbide, which not only allows maximum temperatures for further processing but also has an extremely high stability. In the preferred use of long silicon carbide fibers, blanks which can be wound up, and are extremely flexible and long may also be manufactured.

To improve the further processing of the blank, as well as its compressibility and the spacing of the fibers, the fibers are preferably long silicon carbide fibers with a metal coating made of the same metal or of the same metal alloy as the metal wire meshes. By means of such a metal coating, the packing density of the fibers can also be increased.

In a preferred construction of the blank, the metal wire meshes are linked by means of their tuck loops in a cross-sectionally triangular manner. This has the advantage that, in the center of gravity of the surface of each triangular link, a fiber may be arranged as the woof yarn. Because each triangular link is linked at its corners with an adjacent mesh or an adjacent tuck loop, the blanks can be advantageously deformed and can be adapted to a component or formed body, without any contact between or falling apart of, or shifting of the fibers or the coated fibers. Thus, the advantageous draping capacity of a knitted structure can be utilized to the manufacture fiber-reinforced metallic components.

A high packing density is achieved in a preferred embodiment of the blank in which the metal wire meshes supplement one another to form a uniformly thick blank of metal wire meshes that are triangularly linked to be standing on a vertex and a side. In this case, a lower metal wire forms the metal wire meshes which cross-sectionally stand on the side throughout a blank, and an upper metal wire forms the upper meshes which stand on the vertex, while the pertaining tuck loops alternately form a link between the upper and the lower metal wire. Therefore, very thin mats are advantageously manufactured as blanks, in which case the two fiber layers are arranged offset with respect to one another.

While the fibers are of an arbitrary length, the metal wire meshes are knitted of continuous metal wires in a preferred embodiment of the invention. This has the advantage that the blanks can be manufactured at reasonable cost on conventional industrial-scale knitting machines in a manner well known to those skilled in the art.

To further increase packing density, the fibers preferably form woof yarns placed in meshes, with the fibers which are surrounded by the lower metal wire meshes forming a lower layer, and the fibers which are embedded as the woof yarn into the upper metal wire meshes forming the upper layer. Higher packing density is achieved by means of the offset arrangement of the fibers between the upper and lower fiber layers.

In thick blanks, the fibers are staggered in more than two layers in the knitted material of meshes, with or without a tuck loop. In this manner, advantageously arbitrary thicknesses of the blanks can be achieved.

A preferred metal for the metal wire meshes is titanium. Titanium components are particularly light weight, and are commonly used in the construction of engines, which are subjected to high temperatures, aggressive gas flows and high tensile stress. Fiber reinforcement, for example, in the tensile direction, improves these characteristics and permits a high stressing of the components and a higher reliability of the power units.

In the manufacture of a blank, the fibers are preferably guided as woof yarns in a knitting machine in parallel to the longitudinal axis of the blank, and metal wire meshes are knitted around them in a conventional manner. For this purpose, the fibers are advantageously wound in the form of long fibers off supply spools and are guided to the knitting machine while, transversely to the woof direction, a thin metal wire is knitted around them in a close-meshed manner.

A preferred use of the blank according to the invention is for the manufacture of fiber-reinforced titanium plates, titanium rings or half-finished titanium products. A blank made of fibers and titanium wire meshes placed individually or in several layers or wound into a ring, is compressed by means, of high-temperature isostatic pressing to form fiber-reinforced titanium plates, titanium rings or semi-finished titanium products. The plates, rings or semi-finished products are distinguished by the regular distribution of the fibers in a metal matrix made of titanium.

Another preferred use of the blank is for the manufacture of a self-supporting component made of fiber-reinforced titanium. For this purpose, one or more layers of a blank made of fibers and titanium wire meshes are pulled onto a core and compressed by means of high-temperature isostatic pressing; then the core is removed. In the case of an open structure this may be achieved simply by withdrawing the core as a single unit. For partially closed components, the core is either made to be divisible or is removed, for example, by burning-out or etching-out. ,The use of the blank according to the invention in this process has the advantage that the direction of the fibers in any position can be adapted to the constructional requirements, and even when fiber layers cross one another, contact between the fibers or a sliding of the fibers on one another is prevented. Furthermore, engine blade devices in the blade area may be manufactured from this material, advantageously permitting a high tensile load in the direction of the blade axis.

In addition, the blank may advantageously be used to manufacture self-supporting ring-shaped components, such as shrouds for turbine blade wheels with sealing tips and disk-shaped flanges. For such applications, a ring-shaped component is first wound from a blank by means of meshes consisting of titanium or of a blade material, and subsequently the sealing tips and disk-shaped flanges with titanium-coated or blade-material-coated long SiC fibers are wound onto or on the ring-shaped blank on negative forms. The long fibers and the blank are isostatically compressed at a high temperature to form a component. Because of the increased tensile loading capacity of these shrouds, it is possible for the first time to equip moving blade wheels with a co-rotating dynamically and thermally stable and closed shroud, and to aerodynamically seal the wheels by way of sealing tips arranged radially on the outside so that a further increase of the efficiency of gas turbine engines is achieved.

The blank according to the invention can also be used in coating processes. In this case, the blank is placed, wound, glued, soldered, diffusion-welded or spot-welded in one or several layers onto the component, and by means of a high-temperature isostatic pressing on the component is compressed to form a fiber-reinforced coating.

This coating process has the advantage that highly stressed components, such as engine shafts made of light metals, can be reinforced by means of a stability-increasing coating. Furthermore, An the blade area, the engine blade devices may be constructed to be thinner and therefore lighter.

Other objects, advantages and novel features of the present invention will become apparent from the following detailed description of the invention when considered in conjunction with the accompanying drawings.

BRIEF DESCRIPTION OF THE DRAWINGS

FIG. 6 is a cross-sectional view of a shroud according to FIG. 5;

FIG. 8 is a cross-sectional view of the wound-up shroud form before hot-temperature isostatic pressing.

DETAILED DESCRIPTION OF THE DRAWINGS

Figure 1A:
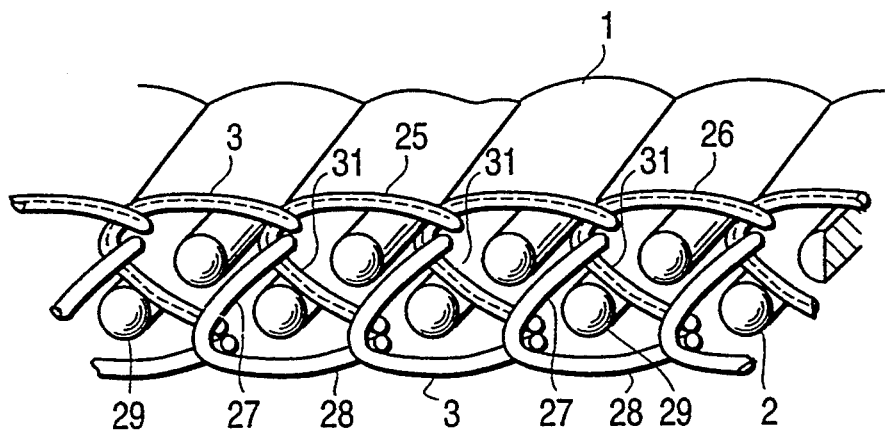
FIG. 1a is a cross-sectional view of a two-layer blank.

FIG. 1a is a cross-sectional view of a two-layer blank 1 with fibers 2 arranged in parallel to its longitudinal axis and which are embedded in metal wire meshes 3. Together with the fibers 2, the metal wire meshes 3 form a mat which is bendable and flexible. Blanks 1 of this type may be placed on one another, and the direction of the fibers 2 may be adapted to the constructional requirements. High temperature isostatic compression of such a blank produces a fiber-reinforced metal strip which has a high packing density of the fibers 2, with each fiber 2 completely encased by metal. The fibers 2 have a thickness of from 20 to 150 $\mu$m, while the diameter of the metal wire is from 20 to 80 $\mu$m.

An upper layer 25 of the fibers 2 is surrounded by upper metal wire meshes 26, with the tuck loop 27 of the lower metal wire meshes 28 and the tuck loop 31 of the upper metal wire meshes 26 linking the upper and the lower metal wire meshes 26, 28 with one another. By means of the triangular linking, the upper layer 25 of the fibers 2 is arranged in an offset manner with respect to a lower layer 29 of the fibers 2. The fibers 2 in the lower fiber layer 29 are enclosed by the lower metal wire meshes 28 and by tuck loops 31 of the upper metal wire meshes 26, each metal wire mesh being linked with the adjacent mesh in a triangular manner. This knitted structure is distinguished by its high draping capacity and flexibility.

Figure 1B:
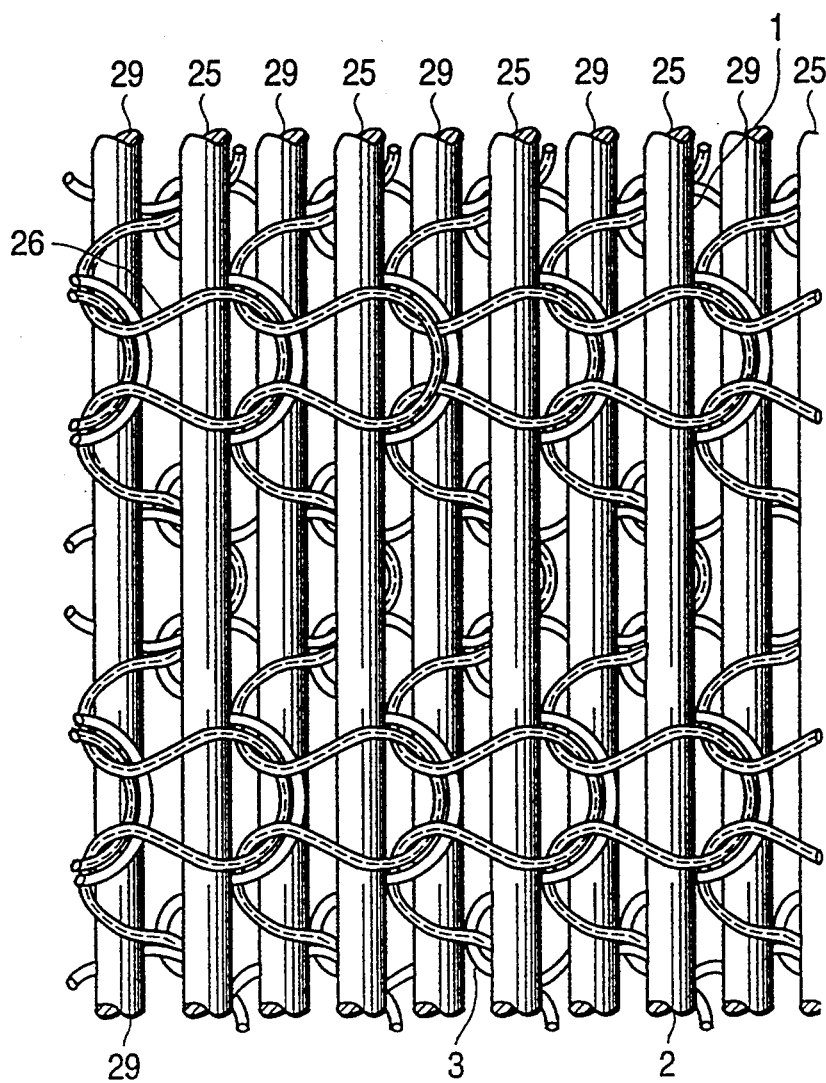
FIG. 1b is a top view of a two-layer blank.

FIG. 1b is a top view of a two-layer blank 1. The alignment of the fibers in parallel to the longitudinal of the blank axis is demonstrated, with the knitting surrounding all sides of the upper layer 25 of the fibers 2 and of the lower layer 29 of the fibers. It is only for a better differentiation that the metal meshes 3, 26 and 28 are shown far apart. For the blank 1 throughout which the fibers extend, the metal wire meshes 3, 26 and 28 are knitted extremely closely so that each fiber is completely enclosed by metal wire and high-temperature isostatic compression of the blank results in a metal matrix without pores.

Figure 2:
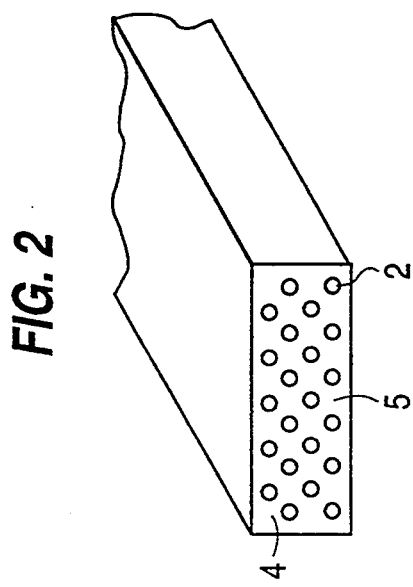
FIG. 2 is a view of a fiber-reinforced titanium plate formed by high temperature isostatic compression of a multi-layer blank according to the invention.

FIG. 2 illustrates a multi-layer blank which has been compressed isostatically at a high temperature to form a fiber-reinforced titanium plate 4. In this example, only two blanks were placed in layers and compressed with one another, so that the fibers 2 are made of silicon carbide and remain equidirectional. As a result of high-temperature isostatic compression, the fibers 2 made of silicon carbide are completely and uniformly surrounded by a titanium matrix 5.

Figure 3:
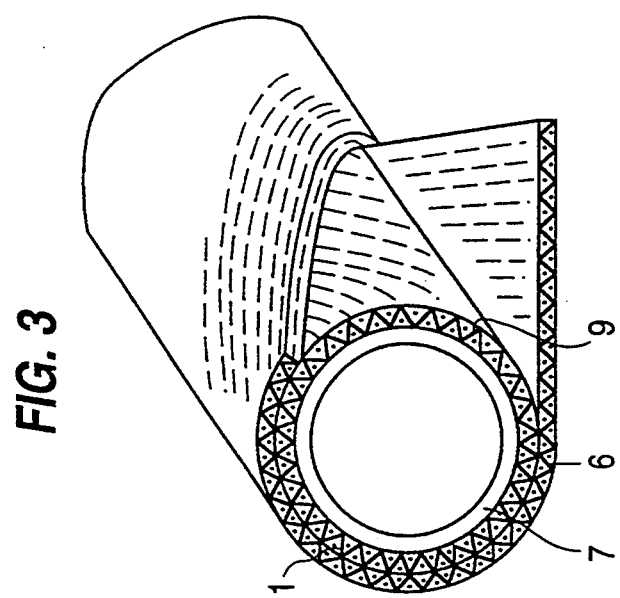
FIG. 3 is a view of a blank which has been wound onto a tube.

FIG. 3 illustrates a blank 1 which is wound onto a tube in a double layer, with the winding direction arranged angularly with respect to the tube axis, and the first layer 9 being wound at a different angle than the second layer 6. Such wound blanks 1 may be processed to form a self-supporting component, if, after the high-temperature isostatic pressing, the tube is withdrawn or etched out.

Figure 4:
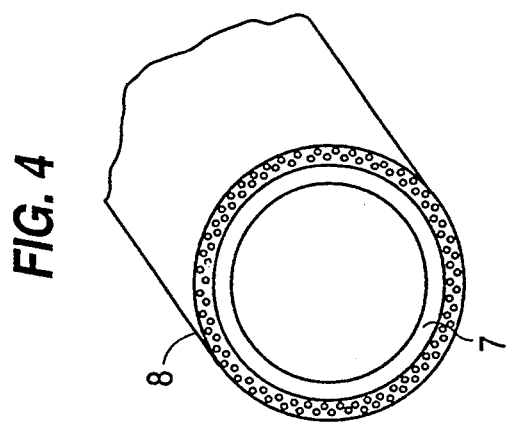
FIG. 4 is a view of a blank wound onto a tube after the compressing to form a tube coating as a fiber-reinforced engine shaft.

FIG. 4 shows a blank wound onto a tube 7 and compressed by means of high-temperature isostatic pressure to form a tube coating 8 for a fiber-reinforced engine shaft. The high-strength fiber-reinforced coating 8 of the tube 7 (which in this example consists of aluminum) provides an extremely light torsion-proof engine shaft.

Figure 5:
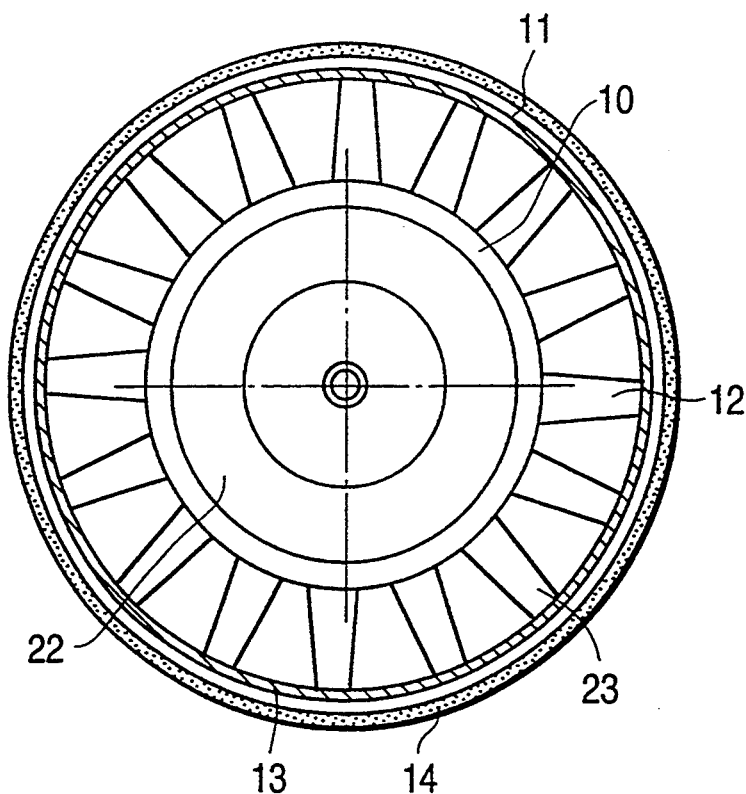
FIG. 5 is a view of a blade wheel comprising a shroud consisting of the blank and coated long fibers.

FIG. 5 shows a blade wheel comprising a shroud 11 consisting of the blank and additional long fibers coated with titanium which encloses the blades 12 in a ring-shaped manner radially on the outside. The sealing gap 13 between the turbine housing 14 and the blade wheel 10, which comprises the blade disk 22, the blade ring 23 with the blades 12 and the shroud 11, is minimized by way of very effective sealing tips 15 which are integrally arranged on the shroud 11. The sealing tips 15 are best shown in FIG. 6 which is a cross-sectional view of a shroud 11 according to FIG. 5. The shroud 11 consists essentially of a shroud ring 16, two disk-shaped flanges 17 and 18 on the outer surfaces of the ring and the sealing tips 15. The inside radius of the shroud ring 16 increases from flange 17 to flange 18.

Figure 7:
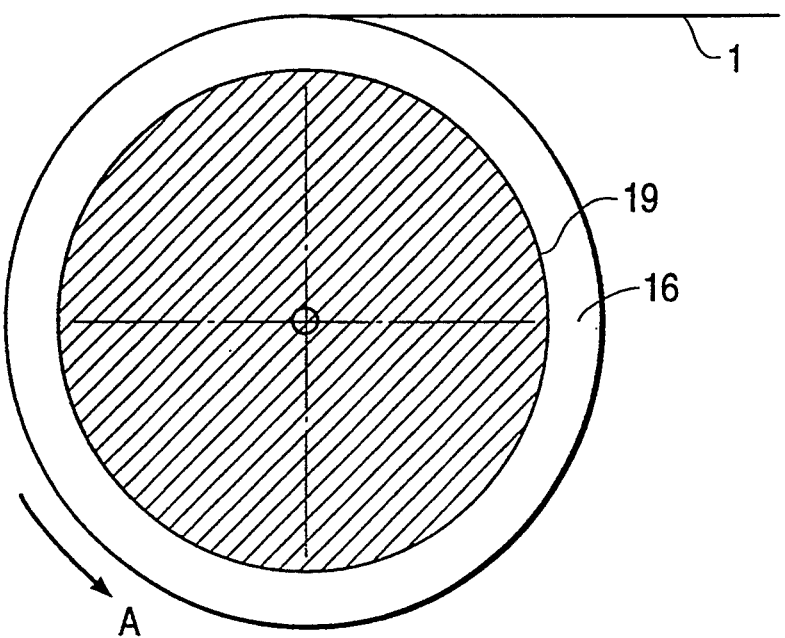
FIG. 7 is a view of the winding of a blank and metal-coated long fibers onto a shroud form.

In order to manufacture such a component from fiber-reinforced titanium, the blank 1 according to the invention, for the shroud ring 16, is wound in several layers on a form 19 in the direction of the arrow A as illustrated in FIG. 7. As shown in FIG. 8, the flanges 17 and 18 and the sealing tips 15 may be wound onto the form 19 by means of titanium-coated long SiC fibers. The free surfaces of the blank 1 and the titanium-coated long SiC-fibers 20 are encapsulated after the winding and evacuated. The whole construction with the form 19 and with the wound unfinished component 21 and the encapsulation (not shown) are then pressed isostatically at a high temperature. After the pressing operation, the form 19, which can be divided in a multiple manner, is separated from the component consisting of the fiber-reinforced metal, and the self-supporting component is freed of its encapsulation and corresponding to FIG. 5 is mounted on the blades 12. Subsequently, the blade ring 23 with the shroud 11 is placed on the blade wheel disk 22.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A process for manufacturing a shroud for turbine blade wheels with sealing tips and disk-shaped flanges using a blank material having
   a plurality of fibers made from a material which has a high tensile strength and is stable at high temperatures;
   a knitted metal wire material comprising a plurality of metal wire mesh;
   said fibers being knitted into and held in said metal wire material in an orientation in which said fibers are separated from each other and are parallel to an axis of said blank;
   said process comprising the steps of:
   winding a ring-shaped component from said blank material;
   winding long silicon carbide fibers on said ring-shaped component on negative forms to form said sealing tips and disc shaped flanges; and
   isostatically compressing the long fibers and the blank at a high temperature to form a component.

* * * * *